(12) United States Patent
Huckabee

(10) Patent No.: US 7,712,999 B1
(45) Date of Patent: May 11, 2010

(54) METHOD AND APPARATUS FOR DRYING SOIL

(76) Inventor: James Huckabee, 3012 Oldham Ct., Raleigh, NC (US) 27604-3530

( * ) Notice: Subject to any disclaimer, the term of this patent is extended or adjusted under 35 U.S.C. 154(b) by 202 days.

(21) Appl. No.: 11/779,696

(22) Filed: Jul. 18, 2007

(51) Int. Cl.
*B09C 1/06* (2006.01)
*A01B 5/04* (2006.01)

(52) U.S. Cl. ............... 405/131; 405/128.55; 405/128.8; 405/130; 404/95; 172/675

(58) Field of Classification Search ............. 405/128.4, 405/128.45, 128.55, 128.8, 130, 131, 258.1, 405/271; 47/1.42; 37/226; 404/95; 172/63, 172/688, 675, 755
See application file for complete search history.

(56) References Cited

U.S. PATENT DOCUMENTS

| | | | | |
|---|---|---|---|---|
| 2,237,775 A | * | 4/1941 | Woods et al. ............... | 111/129 |
| 3,964,183 A | * | 6/1976 | Mouat ........................... | 37/197 |
| 4,172,679 A | * | 10/1979 | Wirtgen ........................ | 404/90 |
| 4,991,341 A | * | 2/1991 | Douglas ........................ | 47/1.7 |
| 5,954,139 A | * | 9/1999 | Forsyth .................... | 172/260.5 |
| 6,189,179 B1 | * | 2/2001 | Baird ........................... | 15/364 |

* cited by examiner

*Primary Examiner*—David J Bagnell
*Assistant Examiner*—Benjamin Fiorello
(74) *Attorney, Agent, or Firm*—Coats & Bennett, P.L.L.C.

(57) ABSTRACT

A method and apparatus for drying soil wherein a soil drying machine is adapted to traverse an area of soil and to dry the soil in the process. The soil drying machine includes a main frame having an air generating device, such as a blower, and a heater mounted thereon. A system of heated air is generated on the soil drying machine and directed downwardly into engagement with the soil being dried. Forming a part of the soil drying machine is a tilling implement. From time-to-time the tilling implement can be lowered and engaged with the soil so as to till the soil prior to the soil being subjected to the heated air, or after the soil has been subjected to the heated air. The soil drying machine may be in the form of a self-propelled unit or a pull-type unit configured to be pulled by a tractor.

20 Claims, 3 Drawing Sheets

METHOD AND APPARATUS FOR DRYING SOIL

BACKGROUND OF THE INVENTION

In constructing building, pavements, and other structures on soil, it is important that the underlying soils have sufficient strength to prevent excessive settlement. When the structures are supported on the soils that are placed as fill to achieve the desired elevations, the soil must be properly compacted to achieve the desired strength characteristics. To achieve this, soil engineers generally take soil samples and analyze the compaction characteristics of the soil to determine the optimum moisture content of the soil to achieve the maximum level of compaction of a given amount of compaction energy. Once the soil has been moisture conditioned to within a small range of its optimum moisture content, the soil can be adequately compacted to achieve the desired strength characteristics, and the construction project can move forward.

One problem often encountered in construction is the presence of excessive moisture in a soil. The soil can be naturally wet, or the soil can become wet during the construction process due to exposure to rain and other forms of inclement weather. When this occurs, the soils must be dried and compacted prior to continuing placement of fill materials or other construction. Adequate compaction of the soils cannot be achieved until the soil is within a small range of its optimum moisture content. Depending upon weather conditions and the time of year, adequate drying of the soil can take days, even weeks. This, of course, results in construction delays, giving rise to delays in the construction schedule, increased costs, and even penalties.

Therefore, there is a need for a method or system that will efficiently dry soil that has a moisture content significantly greater than the optimum moisture content for maximum compaction.

SUMMARY OF THE INVENTION

A method and apparatus for soil drying is disclosed. The apparatus includes a soil drying machine that is adapted to traverse the soil. Mounted on the soil drying machine is an air generation device and a heater. An air system generated by the air generation device is heated by the heater and the heated air system is directed downwardly onto the soil, causing the soil to be dried.

In one embodiment, the soil drying machine is provided with a tilling implement. The tilling implement can be raised or lowered between an upper inoperative position and a lowered soil engaging position. The tilling implement can be selectively employed to till the soil before or after drying. In some cases, the method or process will entail first tilling an area of the soil, followed by drying the tilled area, and retilling the area that has been tilled and dried.

Other objects and advantages of the present invention will become apparent and obvious from a study of the following description and the accompanying drawings which are merely illustrative of such invention.

DETAILED DESCRIPTION

With further reference to the drawings, the soil drying machine 10 of the present invention is shown therein. Soil drying machine 10 is designed to traverse an area of soil or ground and to direct a system of air or heated air downwardly into contact with the soil so as to dry the soil in the process. As discussed below, the soil drying machine may include a tilling implement that tills the soil and in the process facilitates drying of the soil. In the embodiment illustrated herein, the soil drying machine 10 is shown in the form of a pull-type machine. That is, it is designed to be pulled behind a tractor. It is to be understood, however, that the soil drying machine 10 could be a self-propelled machine.

Figure 1:
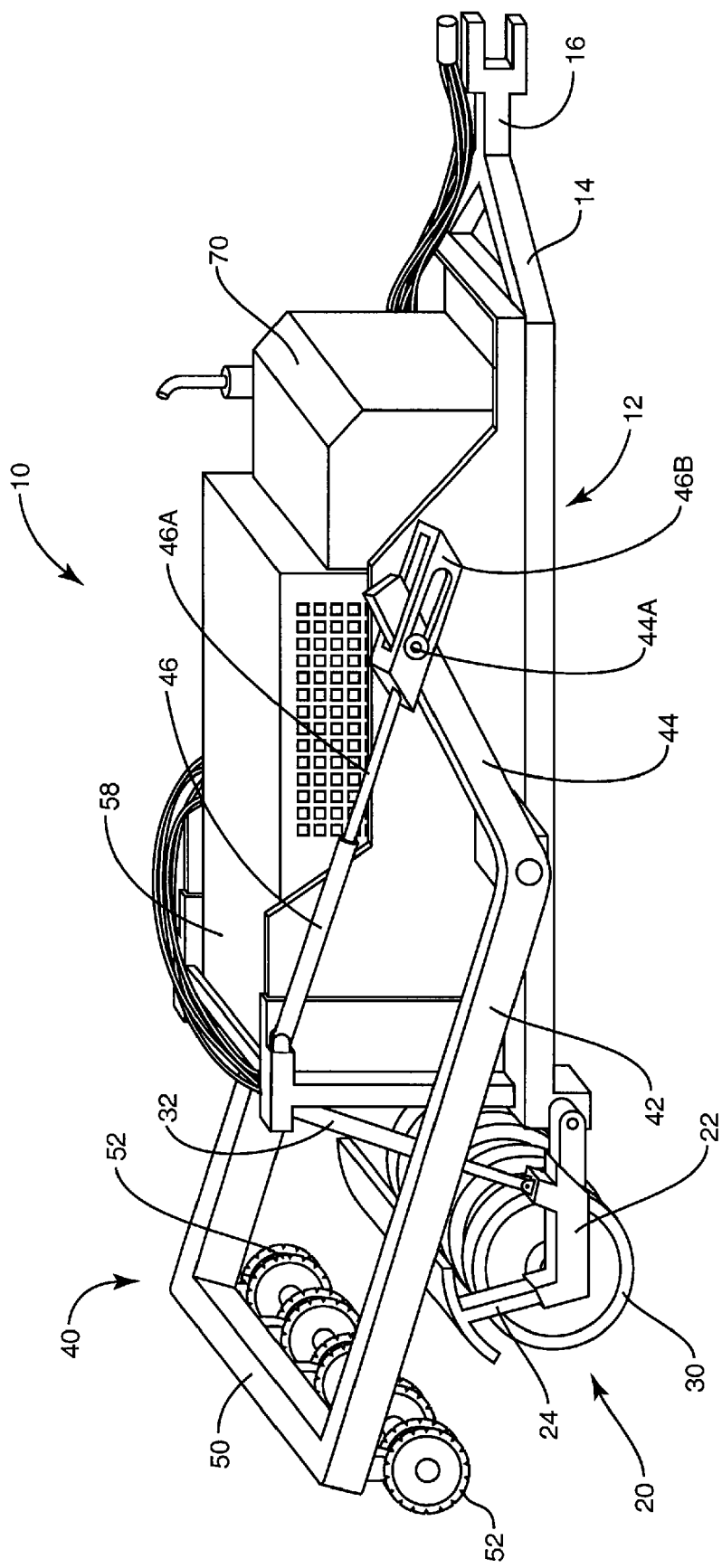
FIG. 1 is a perspective view of the soil drying machine.
Figure 3:
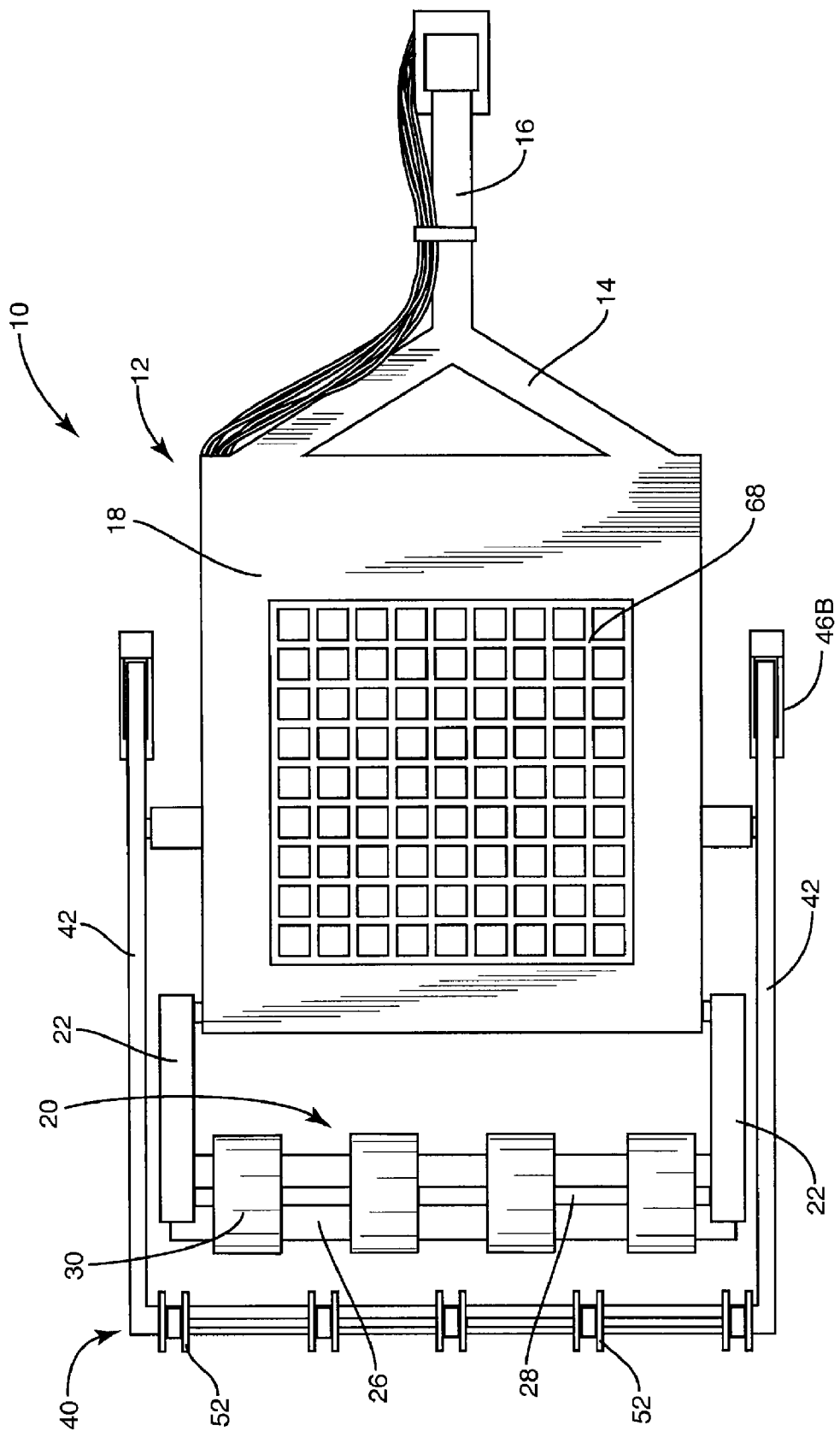
FIG. 3 is a bottom plan view of the soil drying machine.

Turning to a description of the soil drying machine 10, the machine includes a mainframe indicated generally by the numeral 12. In the case of the embodiment illustrated herein, the main frame 12 basically comprises a steel box frame structure. The main frame 12 includes two side members, and front and back transverse members that join the side members to form the box frame. Viewed from the bottom, the main frame 12 includes a bottom panel 18 and a grate 68 formed in the bottom panel. See FIG. 3. A tongue assembly projects forwardly from the main frame 12. As seen in FIG. 1, the tongue assembly includes a V-shaped extension 14 and a tongue 16 projecting forwardly from the V-shaped extension. The tongue 16 is adapted to connect to a tractor.

Mounted about the rear of the soil drying machine 10 is a rear wheel assembly 20. As will be appreciated from subsequent portions of this disclosure, the rear wheel assembly 20 is movable with respect to the main frame 12. This enables the main frame 12 to raise and lower with respect to the underlying soil. That is, by adjusting the position of the rear wheel assembly 20 with respect to the main frame 12, the height of the main frame with respect to the underlying soil can be adjusted.

Viewing rear wheel assembly 20 in more detail, the same includes a wheel frame structure pivotally mounted to the main frame 12 about a transverse axis. This wheel frame structure includes a pair of arms 22 that are pivotally connected about a transverse axis to the main frame 12. Extending generally rearwardly from arms 22 is a pair of extensions 24. Extensions 24 are connected by a rear cross member 26. An axle 28 is secured within the wheel frame structure, and extends transversely across the back of the soil drying machine 10. A plurality of wheels 30 are rotatively mounted on the axle 28. Therefore, as seen in the drawings, the wheels 30 are generally confined within the wheel frame structure that is made up of arms 22, extensions 24 and the transverse cross member 26.

To power the rear wheel assembly 30 there is provided a pair of hydraulic cylinders 32. In the drawings, note that the hydraulic cylinders 32 are disposed on opposite sides of the soil drying machine 10. Each hydraulic cylinder 32 includes a housing that is anchored to the main frame 12. Extending from the housing is a rod that is connected to one of the arms 22. Note in FIG. 1 where each hydraulic cylinder 32 projects generally downwardly from a point of connection with the main frame 12 to where the cylinder's rod attaches to a respective arm 22. Details of the hydraulic system for powering the hydraulic cylinders 32 are not dealt with herein because such is not per se material to the present invention, and further, such hydraulic systems are well known and appreciated by those skilled in the art. In the case of the pull type embodiment, as shown in the drawings, the tractor's hydraulic system can be utilized to power hydraulic cylinders 32. As seen in the drawings, actuating the hydraulic cylinders 32 to retract the rods results in the arms 22 being rotated generally clockwise as viewed in FIG. 1. This effectively lowers the rear portion of the soil drying machine 10. Extending the rods of hydraulic cylinders 32 causes the arms 22 to rotate generally counterclockwise as viewed in FIG. 1. This will tend to raise the rear portion of the soil drying machine 10.

To facilitate soil drying, the soil drying machine 10 is provided with a tilling implement indicated generally by the numeral 40. The tilling implement is secured to the soil drying machine 10 such that it can be moved between an elevated inoperative position (FIGS. 1 and 2) and a lowered soil engaging positions. Tilling implement 40 can be utilized in various ways to facilitate soil drying. In some cases, the tilling implement 40 will engage and till the soil as the soil drying machine traverses the ground. In this case, the soil drying system may not be discharging heated air to dry the soil. Once an area of soil has been tilled, the soil drying machine 10 can traverse the tilled area, and heated air discharged therefrom to dry the soil. After heating the soil, the same soil drying machine 10 can traverse the same area and the tilling implement 40 can be utilized to retill the soil. This basic process can be repeated until an appropriate moisture content is reached within the underlying soil. Other approaches for treating and conditioning the soil can be used. For example, tilling and directing heated air from the soil drying machine 10 can be performed simultaneously, or the two functions or processes can be alternated.

Viewing the tilling implement 40 in more detail, the same includes a linkage or support structure that couples the tilling implement to the main frame 12 of the soil drying machine 10. In the case of the embodiment illustrated herein, this linkage includes a pair of arms 42 that project rearwardly from the soil drying machine 10, and which pivot about a transverse axis. An extension 44 extends from the front portion of each arm 42 and projects generally upwardly therefrom. A pair of hydraulic cylinders 46 is interconnected between the main frame 12 of the soil drying machine 10 and the respective extensions 44. See FIG. 1. Each hydraulic cylinder 46 includes a rod 46A. Secured to the remote end of the rod 46A is a slot-type connector 46B. Each extension 44 includes a stub shaft 44A that projects therefrom into the slot connector 46B that is secured to the rod 46A of each hydraulic cylinder 46. Like the hydraulic cylinders 32 associated with the rear wheel assembly 20, hydraulic cylinders 46 that form a part of the tilling implement linkage can be powered by the tractor's hydraulic system. In both cases, the hydraulic cylinders 32 and 46 can be controlled by the operator while stationed on the tractor.

Continuing to refer to the tilling implement 40, the same includes a carrier frame 50. Carrier frame 50 is secured across the rear ends of the arms 42. See FIG. 1. Carrier frame 50 includes a series of spaced apart tillers 52. The particular type of tiller utilized can vary. Disclosed in the drawings is a series of disc-type tillers. Other tilling devices or implements such as plow-types and even subsoilers can be used.

FIG. 1 shows the tilling implement 40 in the upper inoperative position. In this position the rod 46A is extended and the stub shaft 44A extends through the rear portion of the slot connector 46B. Thus, the extended rod 46A maintains the tilling implement 40 in the upper inoperative position. When the rod 46A is retracted, the extension 44, as viewed in FIG. 1, will tend to rotate counterclockwise. This is because of the weight of the carrier frame 50 and the tillers 52 supported thereby. As the rod 46A is retracted, the arms 42 will be lowered and the tillers 52 will eventually engage the ground. Once the tillers 52 engage the ground, the rod 46A may be continued to be retracted a relative short distance. In any event, in the operative position, the tillers 52 will float or move up and down with respect to the main frame 12 as the soil drying machine 12 traverses the ground. As the tillers 52 float, the stub shaft 44A will move back and forth within the slot connector 46B at least through a limited range. The length of the slot in the slot connector 46B can be designed to provide an acceptable floating range. When it is desired to raise the tilling implement 40 to an upper elevated position, the rod 46A is extended resulting in the stub shaft 46A engaging the rear end of the slot in the slot connector 46B. As the slot connector is pushed or moved forward, the extensions 44 will rotate clockwise causing the arms 42 to likewise rotate clockwise and raise the tilling implement 40 upward to its inoperative position.

Figure 2:
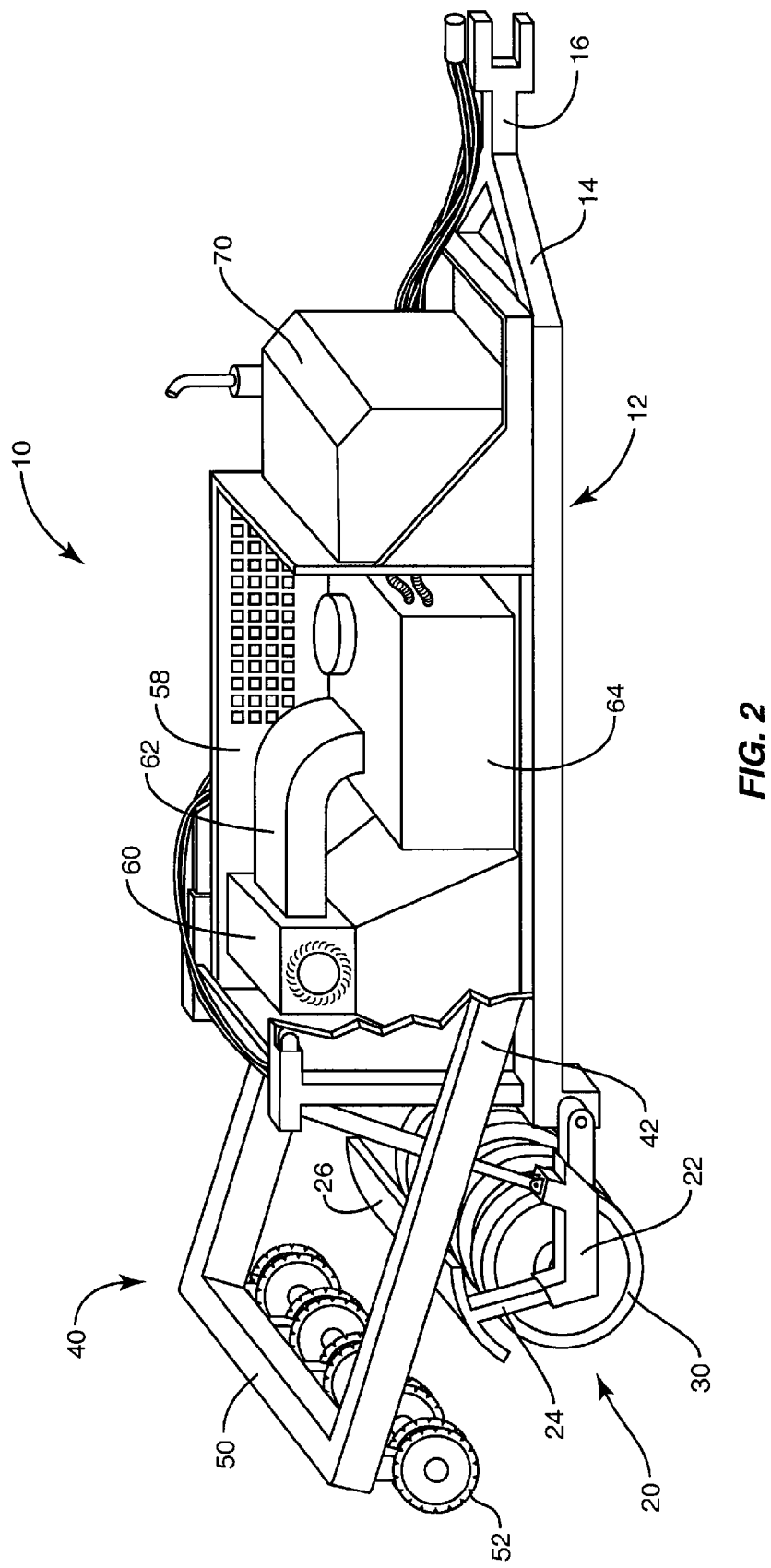
FIG. 2 is a perspective view similar to FIG. 1, but with portions of a housing removed in order to better illustrate structure within the housing.

Disposed on the main frame 12 is a housing 58. Disposed within the housing 58 is an air generation device 60 and a heater 64. Air generation device 60 can be of various types. In one embodiment the air generation device 60 is an electric blower of the squirrel cage fan type. Blower 60 can be sized to generate an appropriate volume of air. In one embodiment the blower 60 could be of a variable speed, permitting the blower to output a variable volume of air. A duct 62 connects the blower 60 with the heater 64. Air is generated by inducing air into the blower 60, and from the blower into the duct 62 where the air is directed to and through the heater 64. Air is preferably induced into the blower 60 at a position above the upper portion of the machine 10. As seen in FIG. 2, for example, air is induced into the side of the blower 60 and then through duct 62 to a heater 64. Various types of heaters can be utilized. In one embodiment, heater 64 is an electric heater having one or more heating coils. The heating coils are positioned in the path of the system of air generated by the blower 60 such that air is heated as it passes through the heater. Other types of heaters, such as a gas heater, can be utilized.

Disposed below blower 60 and heater 64 is an air plenum. The system of air, after it has been heated by the heater 64, passes through the plenum. Disposed on the bottom of the plenum is the bottom panel 18 and grate 68. Heated air within the plenum is exhausted through the grate 68 and downwardly towards the underlying soil. Grate 68 tends to divide the heated air flow and to provide a general uniform distribution of the air over the underlying area of soil.

Heater 64 can be controlled so as to control the temperature of the heated system of air impacting the underlying soil. It is contemplated that the air reaching the soil should be at a temperature of 110° F. or below. It is appreciated, however, that the temperature of the air directed against the soil can vary, depending on various conditions.

Mounted ahead of the housing 58 is a generator 70. Generator 70 is of the gasoline or diesel type, and in the embodiment illustrated herein, is an AC generator. Generator 70 produces electricity that is utilized to power both the blower 60 and the heater 64.

In some embodiments, the generator 70 may be unnecessary. For example, power from the tractor utilized to pull the soil drying machine 12 can be utilized for the various onboard operations. Heater 64 could be powered from the battery of the tractor. Depending upon power requirements, the capacity and strength of the battery may be upgraded, and even the generator or alternator utilized by the tractor can be upgraded to maintain a charge on the battery. In addition, it may be possible for the air generation device or blower 60 to be powered by a hydraulically driven motor where the hydraulic power is derived from the hydraulic system of the tractor. Details of various power systems that can be utilized to drive the blower 60 and the heater 64 are not dealt with herein because such is not per se material to the present invention, and further, those skilled in the art readily appreciate that various types of power systems located onboard the main frame 12 or onboard a towing tractor can be utilized to provide power for onboard operations.

The soil drying machine 10 is typically used to dry an area of soil or ground when the moisture content exceeds an appropriate level for compaction. This occurs, for example, on a construction site when the soil has become wet or even saturated due to a rain. Before soil compaction can be undertaken, the moisture content of the soil must be at an appropriate level. The soil drying machine 10 can be used in various ways. One example is to first till the soil. That is, the soil drying machine 10 is utilized to traverse the area of soil with the tilling implement 40 disposed in its downward operative position. In this position, as the soil drying machine 10 is pulled over the ground or soil, the tillers 52 will engage the soil, tilling the soil and opening up the soil in the process. After a selected area has been tilled, then the soil drying machine can be utilized to traverse over the tilled soil. On this pass, the tilling implement 40 can be raised to its upper inoperative position, and the blower 60 and heater 64 can be actuated. This produces a system of heated air that is directed downwardly through the plenum and out the grate 68 into engagement with the tilled soil. The heated air will tend to dry the soil. This process of first tilling, followed by drying, can be repeated as many times as necessary to condition the soil so that the soil has an appropriate moisture content for compaction. Other approaches to drying the soil can be carried out. For example, both tilling and discharging heated air can be carried out simultaneously. In this case, the soil drying machine traverses the area of soil to be dried, and at the same time the tilling implement 40 is in its lower ground engaging position and the blower 60 and heater 58 are actuated. In this case, heated air is directed downwardly and impinges upon the soil, and the tilling implement follows with a tilling operation. This basic process or method can be repeated as many times as is required to reduce the moisture content of the soil to an appropriate level. From time-to-time during any of these processes, samples of the soil can be taken and tested to determine if the moisture content is appropriate for compaction.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of drying soil on a construction site with a soil drying machine, comprising:
    a. traversing the soil on a construction site with the soil drying machine;
    b. generating a system of air with an air generation device mounted on the soil drying machine;
    c. heating the system of air with a heater mounted on the soil drying machine;
    d. directing the heated system of air generally downwardly from the soil drying machine into contact with the soil being traversed by the soil drying machine, and drying the soil;
    e. generating the system of air including powering a gas or diesel electric generator mounted on the soil drying machine to generate electricity on the soil drying machine and directing the electricity to an electric blower mounted on the soil drying machine and wherein the electric blower generates the system of air;
    f. directing the heated system of air from the soil drying machine into contact with the soil including directing the system of heated air from an air outlet on the soil drying machine where the air outlet extends over a substantial width of the soil drying machine, and wherein the air outlet is directed downwardly from the soil drying machine towards the soil being traversed by the soil drying machine such that as the soil drying machine traverses the soil, the system of heated air is exhausted out of the air outlet on the soil drying machine downwardly into contact with the soil;
    g. engaging the soil with a tilling implement forming a part of the soil drying machine and tilling the soil as the soil drying machine traverses the construction site;
    h. moving the tilling implement between an elevated and operative position and a lowered soil engaging position; and
    i. wherein the tilling implement is mounted to a pair of arms that project from the soil drying machine and wherein the method includes pivoting the arms and raising the tilling implement up and down between an inoperative position and a soil engaging position.

2. The method of claim 1 including raising and lowering the soil drying machine relative to the underlying soil.

3. The method of claim 2 wherein the soil drying machine is a pull type machine, and the method includes pivoting a pair of rear wheel arms about a transverse axis and moving one or more rear wheels relative to the main frame by pivoting the pair of wheel arms so as to raise or lower the main frame with respect to the underlying soil.

4. The method of claim 1 wherein the soil drying machine includes a mainframe and the method includes raising and lowering the mainframe relative to the underlying soil.

5. The method of claim 1 including floating the tilling implement over the soil as the soil drying machine traverses the soil.

6. The method of claim 1 including tilling an area of soil before or after directing the heated system of air into contact with the area of soil.

7. The method of claim 1 including simultaneously tilling the soil and directing the heated system of air into contact with the soil, and wherein the air outlet forms a part of a plenum and wherein the heated air is exhausted from the plenum disposed forwardly of the tilling equipment such that the heated air is exhausted downwardly onto the soil and thereafter the heated soil is engaged by the trailing tilling implement.

8. The method of claim 1 including controlling the temperature of the heated air such that the heated air is at 110° F. or below prior to engaging the soil.

9. The method of claim 1 including generating the system of air with a squirrel cage fan, and directing the generated system of air through a heater, and wherein the squirrel cage fan and heater are disposed above an air plenum, and directing the heated air into the air plenum and out the air outlet which forms a part of the air plenum.

10. The method of claim 1 wherein the air outlet forms a part of an air plenum mounted on the soil drying machine, and wherein the air plenum is configured to receive heated air from the heater, and wherein the method includes directing a swath of heated air from the air outlet of the plenum as the soil drying machine traverses over the soil where the swath of heated air extends over a substantial width of the soil drying machine such that the swath of heated air engages and dries a swath of soil.

11. A soil drying apparatus for drying the soil of a construction site, comprising:
   a. a soil drying machine adapted to traverse the soil of the construction site;
   b. an air generating device mounted on the soil drying machine for generating a system of air;
   c. a heater mounted on the soil drying machine for heating the system of air so as to produce a heated system of air, the heated system of air exhausting from an air outlet on the soil drying machine where the air outlet extends over a substantial width of the soil drying machine;
   d. the soil drying machine being configured to direct the heated system of air generally downwardly from the soil drying machine into contact with the soil being traversed by the soil drying machine to dry the soil;
   e. a tilling implement forming a part of the soil drying machine for tilling the soil of the construction site as the soil drying machine traverses the construction site;
   f. wherein the tilling implement is movably mounted on the soil drying machine and is movable between an elevated and inoperative position and a lowered soil engaging position;
   g. wherein the air generating device includes an electric blower; and
   h. a gas or diesel electric generator mounted on the soil drying machine for generating electricity, and wherein the electricity from the electric generator is directed to the electric blower for driving the electric blower.

12. The soil drying apparatus of claim 11 wherein the tilling implement includes a pair of arms that project rearwardly from the soil drying machine and wherein the arms are pivotally mounted about a transverse axis and are operative to move the tilling implement up and down between an upper inoperative position and a lowered soil engaging position.

13. The soil drying apparatus of claim 11 wherein the soil drying machine includes a main frame and wheels for supporting the main frame and wherein the main frame can be moved with respect to the wheels so as to raise and lower the main frame relative to the underlying soil being traversed by the soil drying machine.

14. The soil drying apparatus of claim 13 wherein the soil drying machine includes a pull type machine; a pair of rear wheel arms pivotally mounted about a transverse axis and operative to move one or more rear wheels secured thereto, and wherein the wheel arms are pivotable with respect to a main frame of the pull type machine, enabling the main frame to move with respect to the underlying soil by pivoting the wheel arms.

15. The soil drying apparatus of claim 11 wherein the tilling implement includes a series of tillers and a linkage interconnecting the tillers to a portion of a frame associated with the soil drying machine, and wherein the linkage is operative to raise and lower the tillers and is further operative to allow the tillers to engage and move up and down during a tilling operation.

16. The soil drying apparatus of claim 11 including a grate mounted below the air generation device and the heater for dispersing heated air from the soil drying machine.

17. The apparatus of claim 11 wherein the soil drying machine includes a plenum supported on the soil drying machine where the plenum is spaced upwardly above the soil traversed by the soil drying machine; and wherein the plenum is operatively connected to the electric blower such that air from the blower is heated by the heater and directed into the plenum where the heated air is directed downwardly and outwardly from the plenum spaced above the soil as a soil drying machine traverses the construction site.

18. The apparatus of claim 17 wherein the tilling implement is supported by the soil drying machine and is longitudinally spaced from the plenum on the soil drying machine.

19. The apparatus of claim 18 wherein:
   a. the tilling implement includes a pair of arms that project rearwardly from the soil drying machine and wherein the arms are pivotally mounted about a transverse axis and are operative to move the tilling implement up and down between an upper inoperative position and a lowered soil engaging position;
   b. the soil drying machine including a mainframe and wheels for supporting the mainframe and wherein the mainframe can be moved with respect to the wheel so as to raise and lower the mainframe relative to the underlying soil being traversed by the soil drying machine;
   c. the soil drying machine being a pull type machine and including a pair of rear wheel arms pivotally mounted about a transverse axis and operative to move one or more rear wheels secured thereto, and wherein the wheel arms are pivotable with respect to the mainframe, enabling the mainframe to move with respect to the underlying soil by pivoting the wheel arms; and
   d. the tilling implement including a series of tillers and a linkage interconnecting the tillers to a portion of a frame associated with the soil drying machine, and wherein the linkage is operative to raise and lower the tillers and is further operative to allow the tillers to engage and move up and down during a tilling operation.

20. The soil drying apparatus of claim 11 including an air plenum mounted on the soil drying machine and operatively connected to the electric blower for receiving heated air, and wherein the air plenum includes an opening facing downwardly towards the soil being traversed by the soil drying machine, and wherein the opening forms an air outlet; and wherein the air outlet that forms a part of the plenum includes a width that extends a substantial distance across the width of the soil drying machine, and wherein the soil drying machine is operative to exhaust a swath of heated air from the air outlet of the plenum downwardly into contact with the soil as the soil drying machine traverses the construction site.

\* \* \* \* \*